United States Patent
Mathur et al.

(10) Patent No.: US 6,839,677 B2
(45) Date of Patent: Jan. 4, 2005

(54) TRANSACTIONAL DATA TRANSFER IN A NETWORK SYSTEM

(75) Inventors: Vishal Mathur, Uttar Pradesh (IN); Deepak Gupta, Delhi (IN); Siva Kumar B Reddy, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/783,258

(22) Filed: Feb. 14, 2001

(65) Prior Publication Data

US 2003/0158820 A1 Aug. 21, 2003

(51) Int. Cl.$^7$ .......................... G06F 7/00; G06F 15/16; G06F 17/60
(52) U.S. Cl. .............................. 705/1; 705/26; 705/40; 705/44; 705/53; 707/10; 709/219
(58) Field of Search ........................... 707/10; 705/500, 705/1, 26, 40, 44, 53, 35, 39, 14, 50, 27; 709/213–224, 217; 380/23, 24, 21; 345/419; 713/168, 169, 170, 171, 155

(56) References Cited

U.S. PATENT DOCUMENTS

| | | | | |
|---|---|---|---|---|
| 5,465,299 A | * | 11/1995 | Matsumoto et al. | 380/23 |
| 5,867,578 A | * | 2/1999 | Brickell et al. | 380/23 |
| 5,915,022 A | * | 6/1999 | Robinson et al. | 380/24 |
| 6,102,287 A | * | 8/2000 | Matyas, Jr. | 705/14 |
| 6,138,107 A | * | 10/2000 | Elgamal | 705/39 |
| 6,233,565 B1 | * | 5/2001 | Lewis et al. | 705/35 |
| 6,240,091 B1 | * | 5/2001 | Ginzboorg et al. | 370/401 |
| 6,353,812 B2 | * | 3/2002 | Frankel et al. | 705/44 |
| 6,539,093 B1 | * | 3/2003 | Asad et al. | 380/279 |
| 2001/0010044 A1 | * | 7/2001 | Aieta et al. | 705/50 |
| 2002/0038348 A1 | * | 3/2002 | Malone et al. | 709/217 |

OTHER PUBLICATIONS

"Electronic Payment Systems", Chapter 6, pp. 168–189, O'Mahony, Perce, & Tewari, 1997 Artech House, Inc.*
NetCash: A design for practicale electronic currency on the Internet, G. Medvinsky and B. Neuman, Information Sciences Institute, University of Southern California, Nov. 1993.*
Electronic Currency for the Internet, Bendnnady Medvinsky and B. Neuman—EM—Electronic Markets/No. 9–10/Oct. 93/p. 23, 24.*

* cited by examiner

Primary Examiner—Bipin Shalwala
Assistant Examiner—David L. Lewis
(74) Attorney, Agent, or Firm—Anthony VS England; T. Rao Coca

(57) ABSTRACT

An internet user using a browser (10) connects to a first server (30) and conducts transactions at the site (30). The user is transferred to a second server (32) along with data relating to the transactions via the user's browser program (10). A digital signature is added to the data prior to transfer. Before the user can access the second server (32), the digital signature is verified, thus promoting security and integrity of the transaction.

24 Claims, 6 Drawing Sheets

Server A: Initialisation

Server B: Initialisation

TRANSACTIONAL DATA TRANSFER IN A NETWORK SYSTEM

FIELD OF THE INVENTION

The present invention relates generally to data transfer via computer and telecommunications networks, such as the Internet and, in particular, to the transfer of information between different servers during an on-line session of an Internet user.

BACKGROUND OF THE INVENTION

The ever-increasing use of the Internet is changing the way many companies conduct business. In earlier years the primary use of the Internet was non-commercial and restricted to users with a high computer literacy. Increasingly, companies are promoting and selling goods and services to the general public via the Internet, and in many cases providing services on-line.

While the commercial use of the Internet still has enormous scope for expansion, it is still regarded with some trepidation by many consumers. Two issues of great concern are ease of use and the security of electronic transactions.

Because information and useful resources are distributed globally, an Internet user typically visits several web sites located on different servers in the course of a single on-line session. Problems arise when the user needs to interact with more than one site during a single commercial transaction. For example, site A, hosted on server A, is an on-line shop and site B, hosted on server B, is a Payment Gateway that validates payment information. The user selects and orders goods at site A, but provides payment details at site B. All relevant information entered by the user at site A should be available to the payment service at site B and, once payment has been approved, site A should be notified of this fact. The user should not have to enter data repeatedly (such as name, address and items selected) and the data should be kept secure at all times. There are several techniques currently available for transferring data between different servers, but they all have shortcomings.

The Hypertext Transfer Protocol (HTTP) used by the World Wide Web is a connectionless mechanism. Once a server has responded to a request from a browser, the connection between the browser and the server is broken and the server retains nothing of the browser user's session. Thus, if the user had filled out an address form and an order form and then requested access to another page, the information provided by the user would be lost on arrival at the new page. The known technique of 'cookies' effectively remembers a series of steps performed by the user and any data relevant to the next steps in a sequence of steps. However the cookies set by a server are valid for that server only and for no other. Thus if the user requires to move to a site on another server, information will be lost.

If two sites transfer information via some application logic, issues of security and synchronisation arise. Some known techniques are described with reference to FIG. 1. Here, an Internet user has access to the Internet 20 via browser software 10 running on the user's computer. Web sites requested by the user are displayed uniformly in the browser 10. Examples of browser software are MS Explorer™, supplied by Microsoft Corporation of Redmond, Wash., USA and Netscape Navigator™, supplied by Netscape Communications Corporation of Mountain View, Calif., USA. A plurality of servers 30, 32 connect to the Internet 20. For ease of depiction, only two servers are shown, but the actual number is of course far higher. Each of the servers 30, 32 hosts one or more web sites which may be accessed by the browser 10. The servers 30, 32 are able to communicate with one another via the Internet 20. In the configuration of FIG. 1, the first server 32 and the second server 30 are also connected by a proprietary Electronic Data Interchange link 40.

In a hypothetical example, site www.recruitdb.com, hosted on server 30, maintains a database of people with skills in Database programming, and site www.recruitjava.com, hosted on server 32 maintains a data base of people looking for jobs in the field of Java™ programing. A potential employer using the browser 10 accesses these web sites in search of suitable employees. An employer looking for programers in both Database and Java™ needs to search both sites separately. If however there is a cooperation agreement between the two sites, the potential employer should be able to do a combined search across the two web sites www.recruitdb.com and www.recruitjava.com. Known techniques for pooling resources in this way are to provide a common database or to share data between the two sites at the back office. Each of these techniques has its disadvantages. Providing a common database would require a redesign of the entire database schema and the software applications running on the two servers 30, 32.

Data sharing between the two databases may be done by regular data interchange (either via the Internet 20 or the EDI link 40) or by RMI/IIOP (Remote Method Invocation over Internet Inter-ORB Protocol) or thirdly, by URL redirection. The data interchange may be done by XML or other means, but this approach would have synchronisation problems and would require a change of database schema and a modification of software on each of the servers 30, 32.

RMI (Remote Method Invocation) is a popular way of doing distributed programing in Java™ which exploits the object-orientated features of the Java™ language. RMI requires that the entire distributed application be programed in Java™, making use of the proprietary Java Remote Method Protocol (JRMP). RMI/IIOP extends this to an architecture supporting networks of distributed objects containing code written in more than one language. RMI/IIOP adopts the standards of CORBA (Common Object Request Broker Architecture), allowing a software object to communicate with other objects that support the CORBA standards. RMI/IIOP may be used to transfer data between servers 30, 32 but it requires additional coding at each of the servers 30, 32 and is not maintainable when the number of sites sharing data increases.

A third known method of data transfer between the servers 30, 32 is Universal Resource Locator (URL) redirection, in which a link on one of the servers 30, 32 forwards the user to the other of the servers 30, 32. A drawback of this method is that the user needs to provide credentials at both servers 30, 32. This is also an insecure way of transferring users between sites.

Another alternative method of transferring data between the sites 30, 32 is the Secure Electronic Transaction (SET) protocol, which deals with secure banking/credit card transactions over open networks. However, SET is used only for payments and not for general data transfer. SET has the disadvantage that users require additional client applications (called "wallets"). In addition, SET has large infrastructural requirements.

Another problem with the techniques outlined above is that application and third party products must be installed on each of the servers 30, 32 if they are to cooperate. There is no way in which, for example, server 30 can use an application installed at the server 32 unless suitable code is written and installed on both servers 30, 32. This introduces an additional cost and a potential source of software errors. This method requires software, and software certificates, to be loaded on multiple sites.

Any arrangement in which information passes between the user and a site on the server 30 via the server 32 as an intermediary represents a security risk and can have a detrimental effect on performance.

It is thus apparent that there is a need for an easy to use method of transferring information between a plurality of servers connected to the Internet, that preferably also is secure.

SUMMARY OF THE INVENTION

According to a first aspect of the invention there is provided a method of transferring information while a user is connected to a network system, the user having a software application for viewing resources on the network system, the method comprising the steps of allowing the user to connect to a first node on the network system, recording one or more transactions of the user at the first node; and transferring a first set of data, via the software application, to a second node on the network, the first set of data relating to the transactions. The method further comprises the steps of adding a first digital signature to the data before the data transfer step; and verifying the first digital signature before allowing the user access to the second node. The user is prohibited from amending the sets of data during transfer via the software application.

According to a second aspect of the invention there is provided a method of transferring information while a user is connected to a network system, the user having a software application for viewing resources on the network system, the method comprising the steps of allowing the user to connect to a first node on the network system, recording one or more transactions of the user at the first node, transferring a first set of data, via the software application, to a second node on the network system, the first set of data relating to the transactions; and transferring one or more further sets of data, via the software application, to one or more further nodes.

According to a third aspect of the invention there is provided a method of transferring information during an on-line session of an Internet user having a browser for viewing Web sites, the method comprising the steps of allowing the user to connect to a first server linked to the Internet, recording one or more transactions of the user at the first server; and transferring a first set of data, via the browser, to a second server linked to the Internet, the first set of data relating to the transactions.

According to a fourth aspect of the invention there is provided a networked client server computing system comprising a client computing apparatus running application software for viewing resources over a network, a network to which the client is connected; and server computing apparatus that can be selectively connected to by the client apparatus via the network and wherein, when the client connects to a the server one or more client transactions occurring at the server are then transferred to one or more other the servers via the application software.

BRIEF DESCRIPTION OF THE DRAWINGS

One or more embodiments of the present invention are now described hereinafter with reference to the drawings, in which.

DETAILED DESCRIPTION AND BEST MODE

Figure 1:
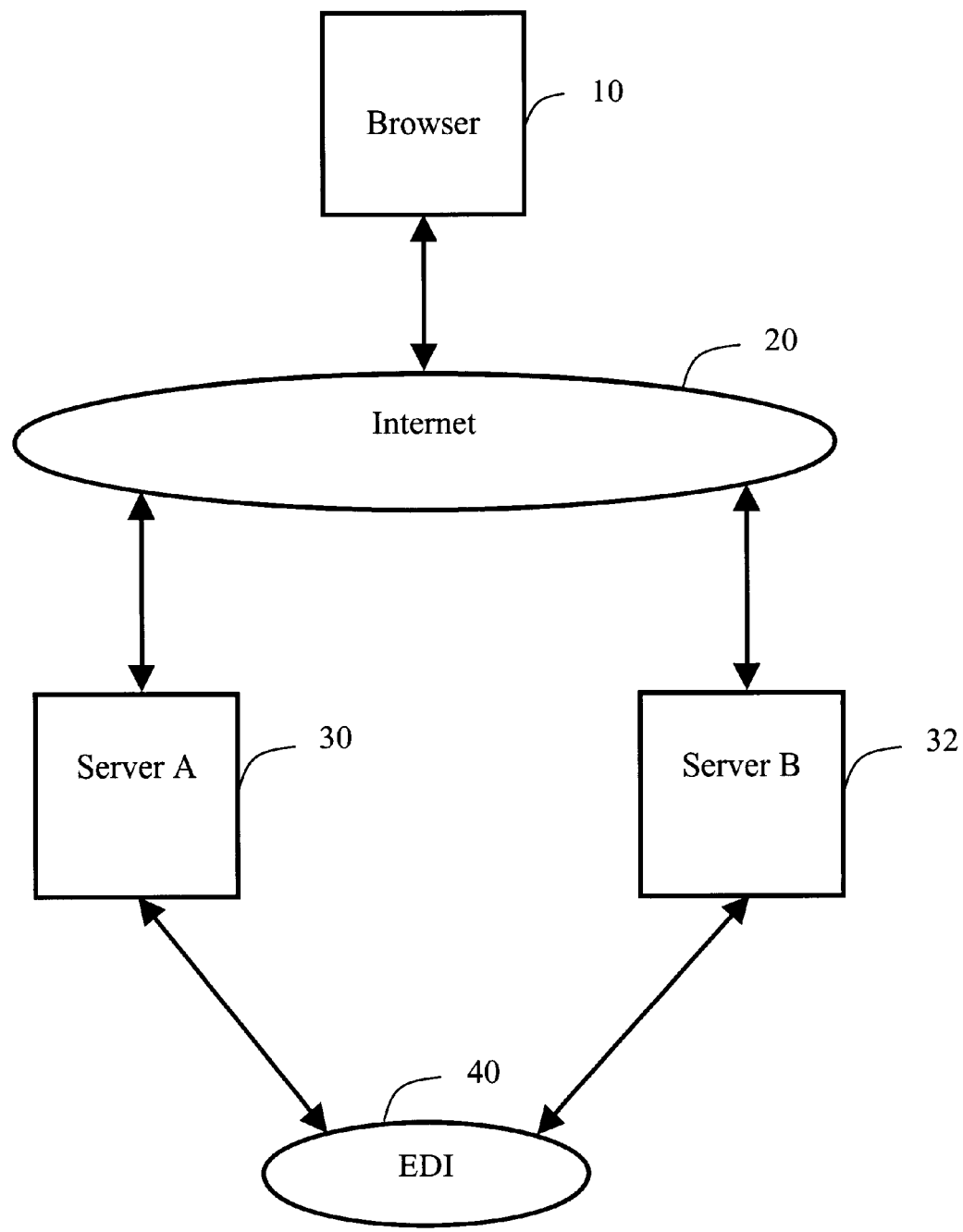
FIG. 1 is a schematic block diagram showing conventional communication paths between servers.

Methods, apparatus and a computer program product are described hereinafter, relating to the secure flow of information between multiple servers on the Internet using a browser as the channel of communication.

Where reference is made in any one or more of the accompanying drawings to steps and/or features which have the same reference numerals, those steps and/or features have for the purposes of this description the same function or operation, unless the contrary intention appears.

The preferred methods described hereinafter comprise a particular control flow. There are many other variants of the preferred methods which use different control flows without departing from the spirit or scope of the invention. Furthermore, one or more of the steps of the preferred methods may be preformed in parallel rather than sequentially.

The principles of the preferred method described herein have general applicability to any open network used for distributed anonymous client-server applications. However, for ease of explanation, the steps of the preferred method are described with reference to web-sites accessible via the Internet. It is not intended that the present invention be limited to the described method.

Figure 2:
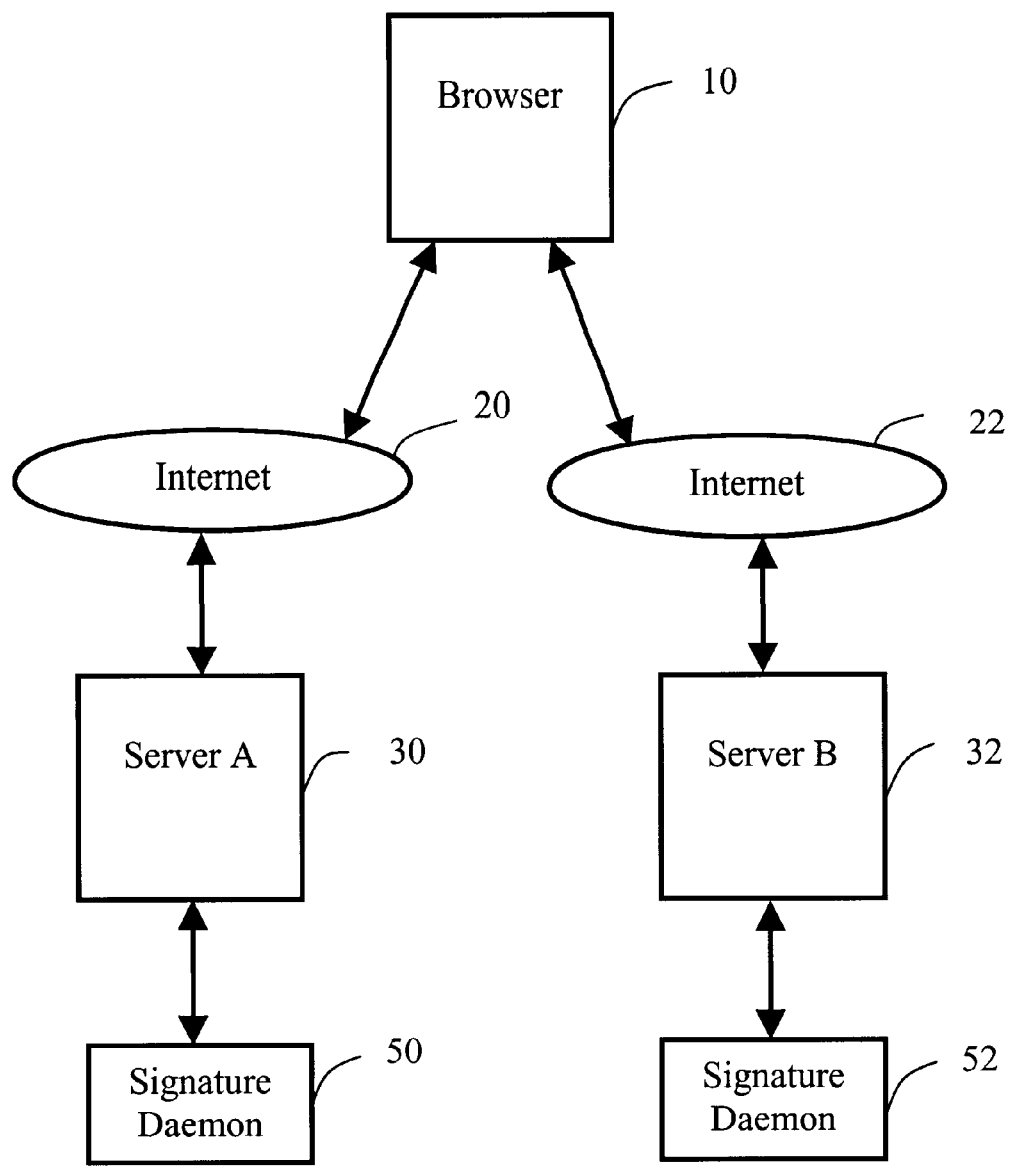
FIG. 2 is a schematic block diagram showing data transfer via a browser.

FIG. 2 shows a system which allows a user of a browser 10 to conduct transactions which require access to web sites on two different servers 30, 32.

A user views web sites using a browser 10. The browser effects connections to the Internet 20, 22. Of course, the Internet elements designated 20 and 22 are in fact the same entity which has been drawn twice to emphasise that the described information flow never proceeds directly from the first server 30 to the second server 32 via the Internet, but is always routed via the browser 10. The first server 30 is connected to the Internet 20, and the second server 32 is connected to the Internet 22. A signature daemon 50 is connected to the first server 30 and a signature daemon 52 is connected to the second server 32.

Figure 3A:
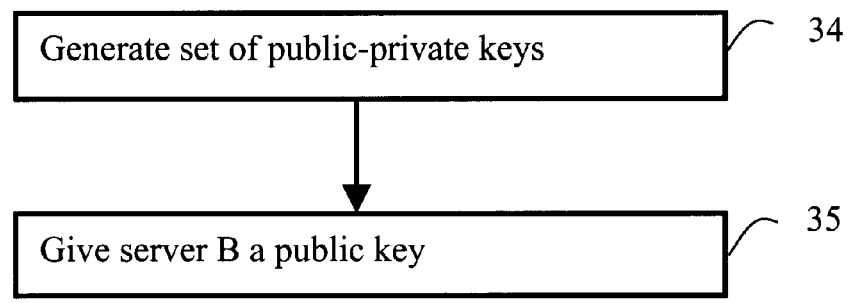
FIGS. 3A and 3B are flow diagrams illustrating initialisation steps.
Figure 3B:
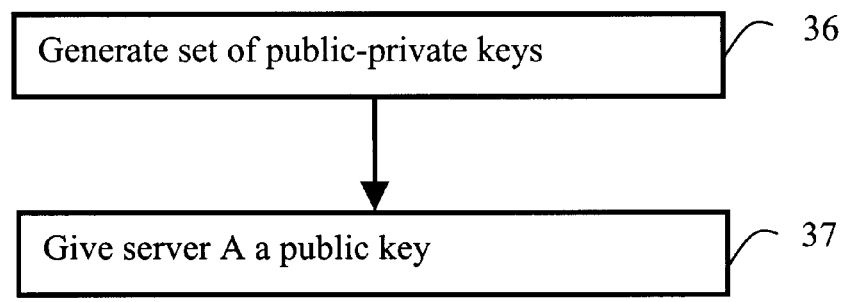

The initialisation process illustrated in FIG. 3A and FIG. 3B. The two servers 30, 32 exchange public keys, enabling the secure transfer of data between the servers 30, 32. In step 34, server A uses known techniques to generate a set of public-private keys. In step 35 server A gives server B a copy of a generated public key.

In a corresponding initialisation step illustrated in FIG. 3B, server B, in step 36, generates a set of public-private keys. In step 37, server B gives server A a copy of the public key generated in step 36.

Although the system architecture is described with only two servers, this is merely for ease of depiction, and the architecture may be extended to include many servers.

A user making use of the browser 10 connects to a web site hosted on server A 30 via the Internet 20. After the user has completed a series of transactions at the site on server A 30, the user must be transferred to a site hosted on server B 32. The transfer may be requested by the user, or the transfer may be triggered by the site residing on server A 30. In either case, information regarding some or all of the transactions conducted by the user on server A 30 must be available to the site on server B 32.

The server A 30 communicates with the signature daemon 50, which generates a digital signature. The information and signature are passed via the Internet 20 to the browser 10, and from the browser 10 to server B 32 via the Internet 22. The information includes the URL of the site on server A 30. The message is transferred via the browser 10 using standard features of protocols such as HTTP, which will be known to those skilled in the art. The message can be transferred with or without user intervention. The message could, for example, be transferred as a form posting using POST or GET methods. POST and GET methods are two standard methods of sending a request to a web server from the client in a predefined encoded format. These are standard techniques/methods, supported by most if not all browsers. Known redirection methods may also be used if there is no user intervention.

Since the digital signature is passed as a name-value pair, the information cannot be tampered with. The user can not amend the information before it has been validated at the site on server B 32. A preferred structure for the message is a Message Identification followed by a Timestamp, the actual data and a Base 64 encoded Signature.

When the server B 32 receives the information with the digital signature, it connects to the signature daemon 52, which verifies the digital signature using the public key provided by server A 30. The signature daemon 52 informs server B 32 whether or not the verification has been successful. If the verification failed, server B 32 sends an error page to be displayed in the browser 10. If, however, the verification is successful, the user is given access to the site on server B 32. Server B 32 then passes back the status of each transaction to server A 30.

When the user has completed the required transactions on server B 32, or when the application running on server B 32 that was invoked by server A 30 has completed its tasks, the user, together with all required data, is transferred back to server A 30. To ensure that this is done in a secure fashion, the server B 32 contacts the signature daemon 52 which provides a digital signature for the data to be transferred, using the public-private keys generated earlier. The data with its digital signature is passed to the browser 10 via the Internet 22, and from the browser 10 to server A 30 via the Internet 20. Since server B 32 knows the URL of server A 30, all the necessary forwarding information can be provided.

After receiving the encrypted data, server A 30 contacts the signature daemon 50, which decrypts the transferred data using the public key of server B 32.

Figure 4:
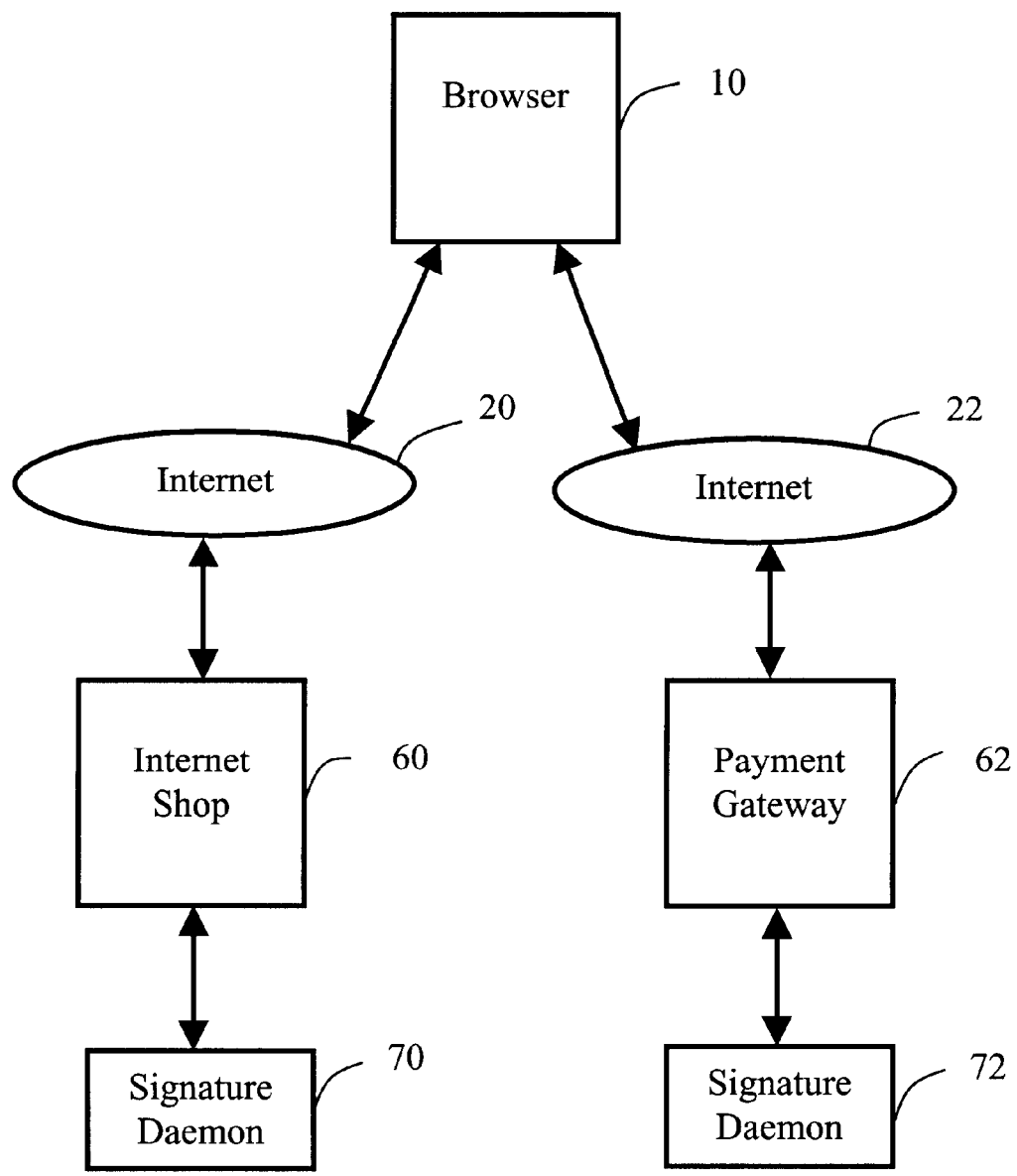
FIG. 4 is a schematic block diagram showing an example of the arrangement of FIG. 2.

FIG. 4 shows an example of the application of the architecture shown in FIG. 2. An Internet shop 60 displays details of a range of products which may be purchased via the Internet. The Internet shop 60 is linked to a signature daemon 70 and to the Internet 20. A payment gateway 62 provides a service of validating payment such as credit card transactions. An arrangement exists between the Internet shop 60 and the payment gateway 62 whereby the shop 60 can make use of the payment validation services of the gateway 62. The shop 60 and the gateway 62 exchange public keys to enable secure exchange of information.

The payment gateway 62 is connected to a signature daemon 72 and also to the Internet 22.

An Internet user uses a browser 10 to surf the World Wide Web. The browser 10 is connected to the Internet 20 and the Internet 22. In reality, the Internet 20 and the Internet 22 are the same network, but in the schematic diagram of FIG. 4 they are drawn separately to indicate that data flow between the shop 60 and the gateway 62 always proceeds via the browser 10 in the described method.

The user views the Internet shop 60 and selects one or more products to purchase. The user then provides details such as a name and address for delivery. When the user is ready to complete the purchase, the Internet shop 60 needs to make use of the payment gateway 62. Data to be transferred securely to the payment gateway includes, for example, the bank account of the Internet shop 60, the name of the user, items purchased and the total amount of the purchase. The signature daemon 70 adds a digital signature to the data which is sent via the Internet 20 to the browser 10 and from the browser 10 to the payment gateway 62 via the Internet 22. The signature daemon 72 validates the signature and, if the validation is successful, the payment gateway will request payment information from the user, such as credit card details.

Once the payment has been successfully made, the payment gateway will transfer this information together with the user back to the Internet shop 60. The signature daemon 72 adds a signature to the data prior to transmission, and the information is sent to the Internet shop 60 via the browser 10.

Figure 5:
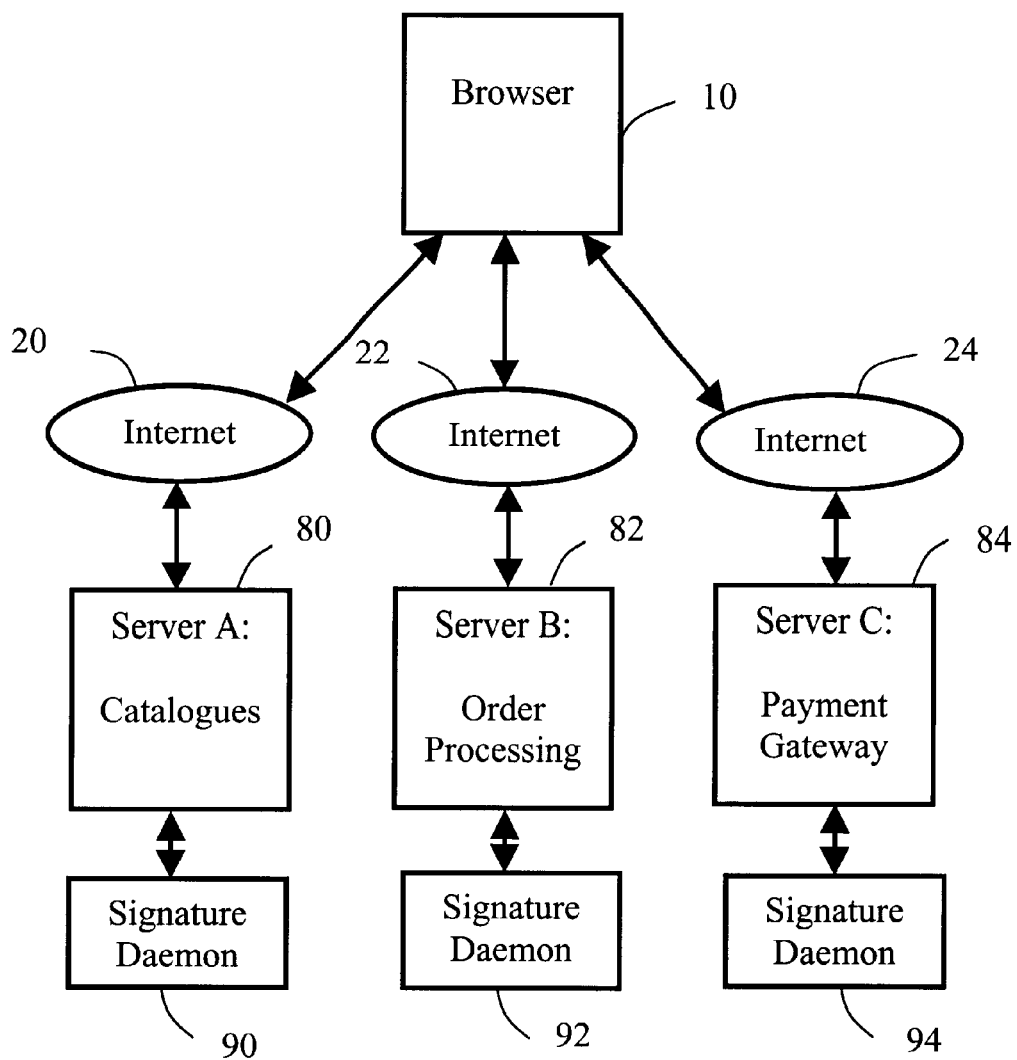
FIG. 5 is a schematic block diagram showing a further example with three servers.

FIG. 5 illustrates data flow in an example involving three servers. The catalogue server 80 hosts a number of product catalogues. The catalogue server 80 is linked to a signature daemon 90 and to the Internet 20.

The order processing server 82 is a site which implements order processing and payment calculation. It provides services such as shopping carts and wish lists, which are well known to those skilled in the art of Internet commerce. The order processing server 82 is connected to a signature daemon 92 and also to the Internet 22.

The payment gateway server 84 is a site which implements a payment gateway. Given a credit card number and order details, the payment gateway 84 validates payment. The payment gateway server 84 is connected to a signature daemon 94 and also to the Internet 24.

A browser 10 is connected to the Internet 20 and to the Internet 22 and to the Internet 24. In practice, the Internet 20, Internet 22 and Internet 24 are the same network, but in the schematic diagram of FIG. 5 they are drawn separately to emphasise that all data flow in the described method proceeds via the browser 10.

In a typical scenario, a user logs on to the Internet using browser 10. The user surfs the catalogues on the catalogue server 80. When the user wishes to add selected items to a shopping cart or a wish list, the user is taken transparently to the order processing server 82. In the background, the catalogue server 80 signs information about the user (such as the user's shipping address, products selected and associated price) by contacting the signature daemon 90. The signed information is passed via the Internet 20 to the browser 10 and from the browser 10 to the order processing server 82 via the Internet 22. The order processing server 82 contacts the signature daemon 92 to ensure that the information has not been modified by the user or anyone else. While connected to the order processing server 82, the user can manage a shopping cart, wish list, current order and view back-orders on the site.

When the user wishes to complete a purchase, the user is taken transparently to the payment gateway 84. The order processing server 82 contacts the signature daemon 92 to digitally sign the user's information which is required by the payment gateway 84. The payment gateway 84 contacts signature daemon 94 to validate the information received from the order processing server 82 and, if the validation is successful, proceeds to ask the user for payment details. Once the payment has been successfully validated, the user is transferred back to the order processing server 82 to complete the transaction. The user can continue to work with the shopping cart and other sites available on the order processing server 82 and can add further products to the shopping cart or create a new order. If the user elects to add new products, the order processing server 82 transfers the user together with all necessary data back to the catalogue server 80.

Further security may be provided by encrypting all transferred data in addition to adding digital signatures.

The described system has the advantage that all data transfer is synchronised with the user actions. This contrasts with conventional systems, in which problems may arise when data concerning a user is transferred between servers but the user-link goes down or when the user arrives at a second site but the data entered at a first site could not be transferred. Using the methods described in this specification, the user and data associated with the user are transferred together.

The user does not need to be aware of surfing (i.e. being passed between) more than one site. The transfer process is transparent to the user and the user follows the logical flow of the transactions as if there were only one site. The described method also has the advantage that applications or solutions developed by third parties need not be installed on all the servers making use of them. They can be installed on the third-party server and may be used by other servers using the data transfer mechanisms described above. The integrity of data is maintained by the use of digital signatures. Even though the information flows via the client's browser, the client is not able to change the data without detection.

A further advantage is that, since data is securely transferred, it need not be replicated and stored at all the sites.

Figure 6:
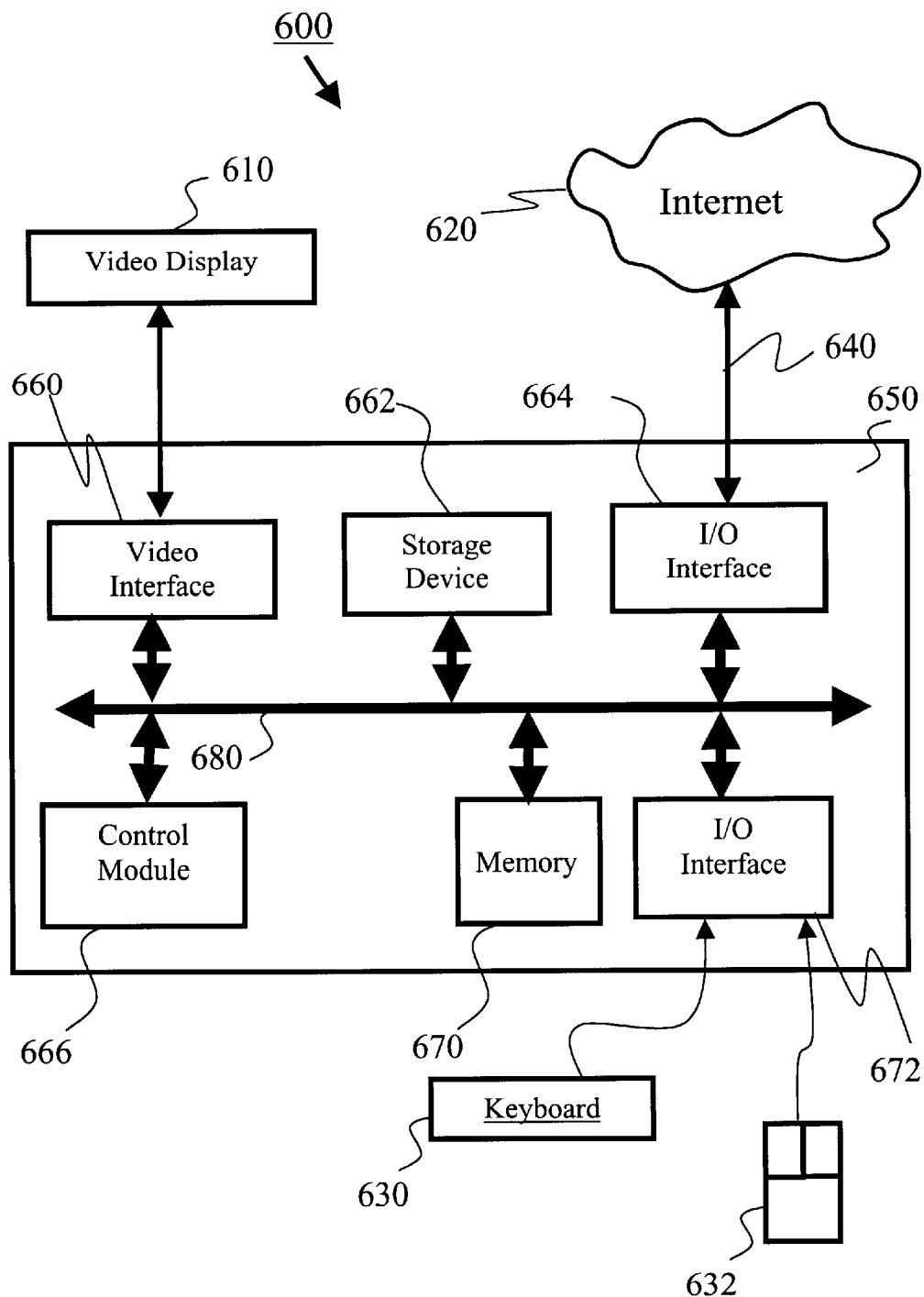
FIG. 6 is a schematic block diagram of a general purpose computer with which the described arrangements can be practiced.

The process for transferring data can be implemented using a computer program product in conjunction with a computer system 600 as shown in FIG. 6. In particular, the method for transferring data can be implemented as software, or computer readable program code, executing on the computer system 600.

The computer system 600 includes a computer 650, a video display 610, and input devices 630, 632. In addition, the computer system 600 can have any of a number of other output devices including line printers, laser printers, plotters, and other reproduction devices connected to the computer 650. The computer system 600 can be connected to one or more other computers via a communication input/output (I/O) interface 664 using an appropriate communication channel 640 such as a modem communications path, an electronic network, or the like. The network may include a local area network (LAN), a wide area network (WAN), an Intranet, and/or the Internet 620.

The computer 650 includes the control module 666, a memory 670 that may include random access memory (RAM) and read-only memory (ROM), input/output (I/O) interfaces 664, 672, a video interface 660, and one or more storage devices generally represented by the storage device 662. The control module 666 is implemented using a central processing unit (CPU) that executes or runs a computer readable program code that performs a particular function or related set of functions.

The video interface 660 is connected to the video display 610 and provides video signals from the computer 650 for display on the video display 610. User input to operate the computer 650 can be provided by one or more of the input devices 630, 632 via the I/O interface 672. For example, a user of the computer 650 can use a keyboard as I/O interface 630 and/or a pointing device such as a mouse as I/O interface 632. The keyboard and the mouse provide input to the computer 650. The storage device 662 can consist of one or more of the following: a floppy disk, a hard disk drive, a magneto-optical disk drive, CD-ROM, magnetic tape or any other of a number of non-volatile storage devices well known to those skilled in the art. Each of the elements in the computer system 650 is typically connected to other devices via a bus 680 that in turn can consist of data, address, and control buses.

The method steps for transferring data are effected by instructions in the software that are carried out by the computer system 600. Again, the software may be implemented as one or more modules for implementing the method steps.

In particular, the software may be stored in a computer readable medium, including the storage device 662 or that is downloaded from a remote location via the interface 664 and communications channel 640 from the Internet 620 or another network location or site. The computer system 600 includes the computer readable medium having such software or program code recorded such that instructions of the software or the program code can be carried out. The use of the computer system 600 preferably effects advantageous apparatuses for constructing a runtime symbol table for a computer program in accordance with the embodiments of the invention.

The computer system 600 is provided for illustrative purposes and other configurations can be employed without departing from the scope and spirit of the invention. The foregoing is merely an example of the types of computers or computer systems with which the embodiments of the invention may be practised. Typically, the processes of the embodiments are resident as software or a computer readable program code recorded on a hard disk drive as the computer readable medium, and read and controlled using the control module 666. Intermediate storage of the program code and any data including entities, tickets, and the like may be accomplished using the memory 670, possibly in concert with the storage device 662.

In some instances, the program may be supplied to the user encoded on a CD-ROM or a floppy disk (both generally depicted by the storage device 662), or alternatively could be read by the user from the network via a modem device connected to the computer 650. Still further, the computer system 600 can load the software from other computer readable media. This may include magnetic tape, a ROM or integrated circuit, a magneto-optical disk, a radio or infrared transmission channel between the computer and another device, a computer readable card such as a PCMCIA card, and the Internet 620 and Intranets including email transmissions and information recorded on Internet sites and the like. The foregoing are merely examples of relevant computer readable media. Other computer readable media may be practised without departing from the scope and spirit of the invention.

The method of transferring data can be realised in a centralised fashion in one computer system 600, or in a distributed fashion where different elements are spread across several interconnected computer systems.

Computer program means or computer program in the present context mean any expression, in any language, code or notation, of a set of instructions intended to cause a system having an information processing capability to perform a particular function either directly or after either or both of the following: a) conversion to another language, code or notation or b) reproduction in a different material form.

In the foregoing manner, a method, an apparatus, and a computer program product for transferring data are disclosed. While only a small number of embodiments are described, it will be apparent to those skilled in the art in view of this disclosure that numerous changes and/or modifications can be made without departing from the scope and spirit of the invention. For example, the described method is not limited to the Internet, but may be applied to any open network with distributed anonymous client-server applications.

We claim:

1. A method of transferring information for a user of a network, the user having a browser software application on a client computing apparatus for viewing resources on said network, the method comprising the steps of:

receiving information by a first server from the client browser for a first transaction with the first server, wherein to complete the first transaction at least a second transaction is performed between the client browser and a least a second server on the network;

sending first data by the first server to the client browser, including data specific to the first transaction, wherein performing the second transaction includes processing the first data by the second server and wherein second data, including data confirming performance of the second transaction, is transferred from the second server to the client browser and is sent from the client browser to the first server;

sending, by the first server to the client browser, with the first data, an address for the second server, so that transparently to the user the client browser is directed to the second server;

triggering, by the first server, a transfer of the first data from the client browser to the second server;

receiving, by the first server, the second data from the client browser; and completing the first transaction, wherein completing the first transaction includes processing the second data by the first server, and wherein all data transferred between the first and second server for the first and second transactions is transferred exclusively through the client browser.

2. The method of claim 1, wherein the method comprises the steps of:

sending, with the first data, by the first server to the client browser, a first digital signature for the first server, wherein the transferring of the first digital signature enables the client browser to transfer the first digital signature to the second server and the second server to verify the first digital signature for the first server.

3. The method of claim 2, wherein the method comprises the steps of:

receiving, by the first server from the client browser, with the second data, a second digital signature sent by the second server, wherein completing the first transaction between the client browser and the first server comprises verifying by the first server the second digital signature for the second server.

4. The method of claim 3, wherein the method comprises the steps of:

generating, by the first server, first public and private keys;

sending, by the first server, the first public key to the second server; and receiving, by the first server, a second public key from the second server, wherein the steps of sending the first public key and receiving the second public key are performed independently of and prior to receiving the selection of the first transaction from the client browser.

5. The method of claim 1, wherein the first transaction offered by the first server includes a purchase order transaction.

6. The method of claim 5, wherein the second transaction offered by the second server includes a payment validation transaction.

7. The method of claim 1, comprising the step of:

receiving, by the first server from the client browser, third data sent by a third server for performing the first transaction, the third data being generated responsive to a third transaction between the client browser and the third server.

8. The method of claim 7, wherein the first transaction for the first server includes a purchase order transaction, the second transaction for the second server includes a payment validation transaction, and the third transaction for the third server includes a product selection transaction.

9. A first server computing system for transferring information for a user of a network, said user having a browser software application on a client computing apparatus for viewing resources on the network, the first server computing system comprising:

a memory operable to store program code;

a processing unit, wherein the processing unit is operable to execute the program code for performing the steps of:

receiving information by the first server from the client browser for a first transaction with the first server, wherein to complete the first transaction at least a second transaction is performed between the client browser and a least a second server on the network;

sending first data by the first server to the client browser, including data specific to the first transaction, wherein performing the second transaction includes processing the first data by the second server and wherein second data, including data confirming performance of the second transaction, is transferred from the second server to the client browser and is sent from the client browser to the first server;

sending, by the first server, to the client browser, with the first data, an address for the second server, so that transparently to the user the client browser is directed to the second server;

triggering, by the first server, a transfer of the first data from the client browser to the second server;

receiving, by the first server, the second data from the client browser; and completing the first transaction, wherein completing the first transaction includes processing the second data by the first server, and wherein all data transferred between the first and second server for the first and second transactions is transferred exclusively through the client browser.

10. The system of claim 9, wherein the processing unit is operable to execute the program code for performing the steps of:
sending, with the first data, by the first server to the client browser, a first digital signature for the first server, wherein the transferring of the first digital signature enables the client browser to transfer the first digital signature to the second server and the second server to verify the first digital signature for the first server.

11. The system of claim 9, wherein the processing unit is operable to execute the program code for performing the steps of:
receiving, by the first server from the client browser, with the second data, a second digital signature sent by the second server, wherein completing the first transaction between the client browser and the first server comprises verifying by the first server the second digital signature for the second server.

12. The system of claim 11, wherein the processing unit is operable to execute the program code for performing the steps of:
generating, by the first server, first public and private keys;
sending, by the first server, the first public key to the second server; and
receiving, by the first server, a second public key from the second server, wherein the steps of sending the first public key and receiving the second public key are performed independently of and prior to receiving the selection of the first transaction from the client browser.

13. The system of claim 9, wherein the first transaction for the first server includes a purchase order transaction.

14. The system of claim 13, wherein the second transaction for the second server includes a payment validation transaction.

15. The system of claim 9, wherein the processing unit is operable to execute the program code for performing the steps of:
receiving, by the first server from the client browser, third data sent by a third server for performing the first transaction, the third data being generated responsive to a third transaction between the client browser and the third server.

16. The system of claim 15, wherein the first transaction for the first server includes a purchase order transaction, the second transaction for the second server includes a payment validation transaction, and the third transaction for the third server includes a product selection transaction.

17. A computer program product for a first server computing system for transferring information for a user connected to a network, said user having a browser software application on a client computing apparatus for viewing resources on said network, said computer program product comprising:
instructions for receiving a selection by the first server from the client browser of a first transaction offered by the first server on the network, wherein to complete the first transaction at least a second transaction is performed between the client browser and a least a second server on the network;
instructions for sending first data by the first server to the client browser, including data specific to the first transaction, wherein performing the second transaction includes processing the first data by the second server, and wherein second data, including data confirming performance of the second transaction, is transferred from the second server to the client browser and sent from the client browser to the first server;
instructions for sending by the first server to the client browser, with the first data, an address for the second server, so that transparently to the user the client browser is directed to the second server;
instructions for triggering, by the first server, a transfer of the first data from the client browser to the second server;
instructions for receiving, by the first server, the second data from the client; and
instructions for completing the first transaction, wherein completing the first transaction includes processing the second data, by the first server, and wherein all data transferred between the first and second server for the first and second transactions is transferred exclusively through the client browser.

18. The computer program product of claim 17, comprising:
instructions for sending with the first data, by the first server to the client browser, a first digital signature for the first server for enabling the client browser to transfer the first digital signature to the second server and the second server to verify the first digital signature for the first server.

19. The computer program product of claim 18, comprising:
instructions for receiving, by the first server, with the second data from the client browser, a second digital signature sent by the second server, wherein the instructions for completing the first transaction include instructions for verifying by the first server the second digital signature for the second server.

20. The computer program product of claim 19, comprising:
instructions for generating, by the first server, first public and private keys;
instructions for sending, by the first server, the first public key to the second server; and
instructions for receiving, by the first server, a second public key from the second server, wherein the sending of the first public key and receiving of the second public key are performed independently of and prior to receiving the selection of the first transaction from the client browser.

21. The computer program product of claim 17, wherein the first transaction offered by the first server includes a purchase order transaction.

22. The computer program product of claim 17, wherein the second transaction offered by the second server includes a payment validation transaction.

23. The computer program product of claim 17, wherein the processing unit is operable to execute the program code for performing the steps of:
receiving, by the first server from the client browser, third data sent by a third server for performing the first transaction, the third data being generated responsive to a third transaction between the client browser and the third server.

24. The computer program product of claim 23, wherein the first transaction for the first server includes a purchase order transaction, the second transaction for the second server includes a payment validation transaction, and the third transaction for the third server includes a product selection transaction.

* * * * *